United States Patent
Unger et al.

(10) Patent No.: US 11,105,375 B2
(45) Date of Patent: Aug. 31, 2021

(54) RETENTION SYSTEM FOR BEARING MEMBER

(71) Applicant: Caterpillar Inc., Peoria, IL (US)

(72) Inventors: Daniel Thomas Unger, Yorkville, IL (US); Suresh Sappa, Champaign, IL (US); Scott Shaffer, Tucson, AZ (US); Steven J. Fujan, Oro Valley, AZ (US); Jacob P. Fawer, Tucson, AZ (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/738,026

(22) Filed: Jan. 9, 2020

(65) Prior Publication Data
US 2021/0215203 A1    Jul. 15, 2021

(51) Int. Cl.
| F16C 35/06 | (2006.01) |
| F16C 33/66 | (2006.01) |
| F16C 23/04 | (2006.01) |
| F16C 23/08 | (2006.01) |
| F16C 35/067 | (2006.01) |

(52) U.S. Cl.
CPC .......... *F16C 35/067* (2013.01); *F16C 23/043* (2013.01); *F16C 23/084* (2013.01); *F16C 33/6629* (2013.01); *F16C 2226/60* (2013.01)

(58) Field of Classification Search
CPC ........ F16C 11/06; F16C 23/043; F16C 23/10; F16C 2226/60; F16C 2350/26; F16C 23/084; F16C 35/067; F16C 33/6629
USPC ....... 384/192, 537, 540, 191.3; 403/121–122
See application file for complete search history.

(56) References Cited

U.S. PATENT DOCUMENTS

| 2,312,648 A | * | 3/1943 | Jones | ...................... B21B 31/07 72/248 |
| 3,238,647 A | * | 3/1966 | Hall | ........................ B62D 49/04 172/816 |
| 3,347,577 A | * | 10/1967 | Carlson | .................. B62D 53/02 403/147 |
| 3,433,502 A | * | 3/1969 | Omon | ..................... G03G 13/08 280/400 |
| 3,683,754 A | * | 8/1972 | Stuyvenberg | ......... F16C 23/045 92/165 R |

(Continued)

FOREIGN PATENT DOCUMENTS

| DE | 3336398 | 5/1987 |
| EP | 2853762 | 1/2018 |
| JP | 6561523 | 8/2019 |

*Primary Examiner* — Marcus Charles
(74) *Attorney, Agent, or Firm* — von Briesen & Roper, s.c.

(57) ABSTRACT

A retention system for a bearing member includes a sleeve member and a retention member. The retention system includes an inner shoulder adapted to limit movement of the bearing member in at least one of a first axial direction and a second axial direction relative to the bore. The retention system includes an outer shoulder adapted to limit movement of at least one of the sleeve member and the retention member in at least one of the first axial direction and the second axial direction relative to the bore. The retention system includes a plurality of fasteners adapted to limit movement of each of the sleeve member and the retention member in at least one of the first axial direction and the second axial direction relative to the bore. Each of the sleeve member and the retention member is adapted to limit contact of the bearing member with the bore.

20 Claims, 6 Drawing Sheets

(56) References Cited

U.S. PATENT DOCUMENTS

| | | | | |
|---|---|---|---|---|
| 3,778,174 | A | * | 12/1973 | Molby .................. B62D 53/02 |
| | | | | 403/143 |
| 3,806,158 | A | * | 4/1974 | Casey .................... B62D 53/02 |
| | | | | 280/400 |
| 3,862,769 | A | * | 1/1975 | Bechman ............... B62D 53/02 |
| | | | | 280/400 |
| 4,708,499 | A | * | 11/1987 | Loser .................... F16C 23/084 |
| | | | | 384/484 |
| 9,261,105 | B2 | | 2/2016 | Schmidt |
| 9,416,518 | B2 | * | 8/2016 | Ditzler ................... E02F 9/006 |
| 9,709,067 | B2 | | 7/2017 | Chekansky et al. |
| 10,006,486 | B2 | * | 6/2018 | Wojtkowski, Jr. .... B21B 31/074 |
| 10,415,644 | B2 | | 9/2019 | Iizuka et al. |
| 2008/0019766 | A1 | * | 1/2008 | Flaim .................. F16C 11/0609 |
| | | | | 403/122 |
| 2013/0302083 | A1 | * | 11/2013 | Matignon ................ B64F 5/50 |
| | | | | 403/122 |
| 2016/0273187 | A1 | * | 9/2016 | Hoyt .................... F16C 11/069 |

\* cited by examiner

FIG. 5  SECTION Y-Y

FIG. 6

RETENTION SYSTEM FOR BEARING MEMBER

TECHNICAL FIELD

The present disclosure relates to a retention system for a bearing member. More particularly, the present disclosure relates to the retention system for the bearing member disposed within a bore.

BACKGROUND

A bearing member, such as a roller bearing, a spherical bearing, and so on, is retained within a bore using a snap ring. The snap ring engages with a groove provided in the bore and a side surface of the bearing member in order to retain the bearing member within the bore. In many situations, the bearing member may experience substantial axial loads. In such situations, the snap ring may be unable to withstand the axial loads and may fail, in turn, resulting in failure of the bearing member and/or the bore.

Also, a clearance may be provided between the snap ring and the bearing member and/or the bore. The clearance may result in relative movement between the bearing, the snap ring, and the bore during operation of the bearing. In many situations, the relative movement may result in friction and wear of mating surfaces, in turn, resulting in failure of the snap ring, the bearing member, and/or the bore. Hence, there is a need for an improved retention system for the bearing member for such applications.

European Patent Number 2,853,762 discloses a method for manufacturing a rolling bearing unit with a retainer plate. During assembly of an outer ring into the rolling bearing unit, the retainer plate having large-diameter sections provided at plural locations in a circumferential direction of a support hole is used. With a small-diameter stepped section of the outer ring fitted inside this support hole, a punch presses circumferential edges of the large-diameter sections in an axial direction of the retainer plate toward a step surface between an outer-circumferential surface of the outer ring and a base section in an axial direction of the small-diameter stepped section and plastically deforms the circumferential edges of the large-diameter sections inward in a radial direction to form engagement protrusions. Also, the engagement protrusions are engaged with an engagement groove formed around the outer-circumferential surface of the small-diameter stepped section.

SUMMARY OF THE DISCLOSURE

In an aspect of the present disclosure, a retention system for a bearing member disposed within a bore is provided. The retention system includes a sleeve member disposed between the bearing member and the bore. The sleeve member has a substantially annular configuration defining an outer side, an inner side, an outer surface, and an inner surface. The retention system includes a retention member disposed between the bearing member and the bore. The retention member has a substantially annular configuration defining an outer side, an inner side, an outer surface, and an inner surface. The inner side of the retention member is disposed adjacent to the inner side of the sleeve member. The retention system includes an inner shoulder disposed on the inner surface of at least one of the sleeve member and the retention member. The inner shoulder is adapted to engage with the bearing member and limit movement of the bearing member in at least one of a first axial direction and a second axial direction relative to the bore. The retention system also includes an outer shoulder disposed on the outer surface of at least one of the sleeve member and the retention member. The outer shoulder is adapted to engage with the bore and limit movement of at least one of the sleeve member and the retention member in at least one of the first axial direction and the second axial direction relative to the bore. The retention system further includes a plurality of fasteners disposed through each of the sleeve member and the retention member. Each of the plurality of fasteners is disposed spaced apart from another. Each of the plurality of fasteners is adapted to limit movement of each of the sleeve member and the retention member in at least one of the first axial direction and the second axial direction relative to the bore. Each of the sleeve member and the retention member is adapted to limit contact of the bearing member with the bore.

In another aspect of the present disclosure, a machine is provided. The machine includes a chassis and an axle frame. The axle frame has a bore and is pivotally coupled to the chassis through the bore. The machine also includes a bearing member disposed within the bore between the chassis and the axle frame. The machine further includes a retention system disposed within the bore in association with the bearing member. The retention system includes a sleeve member disposed between the bearing member and the bore. The sleeve member has a substantially annular configuration defining an outer side, an inner side, an outer surface, and an inner surface. The retention system includes a retention member disposed between the bearing member and the bore. The retention member has a substantially annular configuration defining an outer side, an inner side, an outer surface, and an inner surface. The inner side of the retention member is disposed adjacent to the inner side of the sleeve member. The retention system includes an inner shoulder disposed on the inner surface of at least one of the sleeve member and the retention member. The inner shoulder is adapted to engage with the bearing member and limit movement of the bearing member in at least one of a first axial direction and a second axial direction relative to the bore. The retention system also includes an outer shoulder disposed on the outer surface of at least one of the sleeve member and the retention member. The outer shoulder is adapted to engage with the bore and limit movement of at least one of the sleeve member and the retention member in at least one of the first axial direction and the second axial direction relative to the bore. The retention system further includes a plurality of fasteners disposed through each of the sleeve member and the retention member. Each of the plurality of fasteners is disposed spaced apart from another. Each of the plurality of fasteners is adapted to limit movement of each of the sleeve member and the retention member in at least one of the first axial direction and the second axial direction relative to the bore. Each of the sleeve member and the retention member is adapted to limit contact of the bearing member with the bore.

In yet another aspect of the present disclosure, a method for protecting a bore provided within a component is provided. The bore is adapted to removably receive a bearing member. The method includes removably providing a sleeve member between the bearing member and the bore. The method includes removably providing a retention member between the bearing member and the bore, and adjacent to the sleeve member. The method includes limiting movement of the bearing member in at least one of a first axial direction and a second axial direction relative to the bore by an inner shoulder. The method includes limiting movement of at least one of the sleeve member and the retention member in at least one of the first axial direction and the second axial direction relative to the bore by an outer shoulder. The method also includes limiting movement of each of the sleeve member and the retention member in at least one of the first axial direction and the second axial direction relative to the bore by a plurality of fasteners. The method further includes limiting contact of the bearing member with the bore by each of the sleeve member and the retention member.

Other features and aspects of this disclosure will be apparent from the following description and the accompanying drawings.

DETAILED DESCRIPTION

Figure 1:
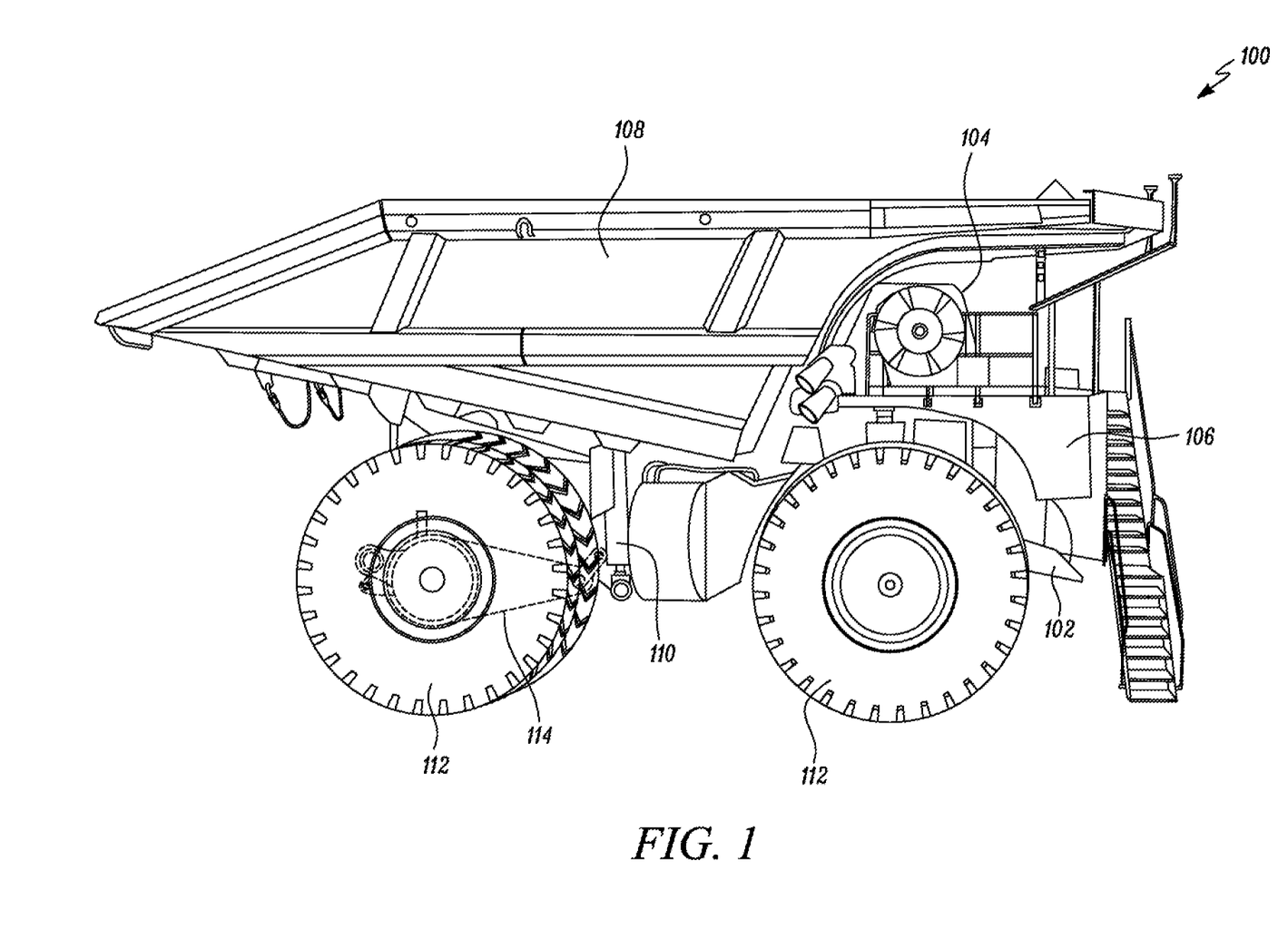
FIG. 1 is a side view of an exemplary machine, according to one embodiment of the present disclosure.

Wherever possible, the same reference numbers will be used throughout the drawings to refer to the same or the like parts. Referring to FIG. 1, an exemplary machine 100 is illustrated. In the illustrated embodiment, the machine 100 is an off-highway truck. The machine 100 is adapted to transport material such as ore, soil, rocks, and so on from one location to another. In other embodiments, the machine 100 may be any other machine such as a mining truck, an articulated truck, a haul truck, a dozer, a wheel loader, a locomotive, and so on. The machine 100 may be any machine related to an industry including, but not limited to, construction, transportation, mining, material handling, aviation, marine, and waste management.

The machine 100 includes a chassis 102. The chassis 102 is adapted to support various components of the machine 100. The machine 100 includes an enclosure 104 provided on the chassis 102. The enclosure 104 is adapted to house a power source (not shown) of the machine 100. The power source is adapted to provide power to the machine 100 for operational and mobility requirements. The power source may be any power source known in the art, such as an internal combustion engine, an electric motor, a battery, and so on. Additionally, the enclosure 104 may also include various components and systems (not shown) of the machine 100, such as an engine system, a transmission system, an electric drive system, a drive control system, a lubrication system, an engine control system, a cooling system, an air supply system, and so on.

The machine 100 includes an operator cabin 106 mounted on the chassis 102. The operator cabin 106 is adapted to house one or more controls (not shown), such as a steering, a pedal, a lever, a control console, buttons, knobs, audio visual system, alarm system, and so on. The controls are adapted to operate and control the machine 100 on ground. The machine 100 includes a load bed 108 provided on the chassis 102. The load bed 108 is adapted to load and unload material therefrom for transporting the material from one location to another. The machine 100 also includes one or more hydraulic cylinders 110 coupled between the chassis 102 and the load bed 108. The hydraulic cylinders 110 are adapted to tilt the load bed 108 during unloading of the material. The machine 100 further includes a set of wheels 112 mounted to the chassis 102 via an axle frame 114. The wheels 112 are adapted to support and provide mobility to the machine 100 on the ground.

Figure 2A:
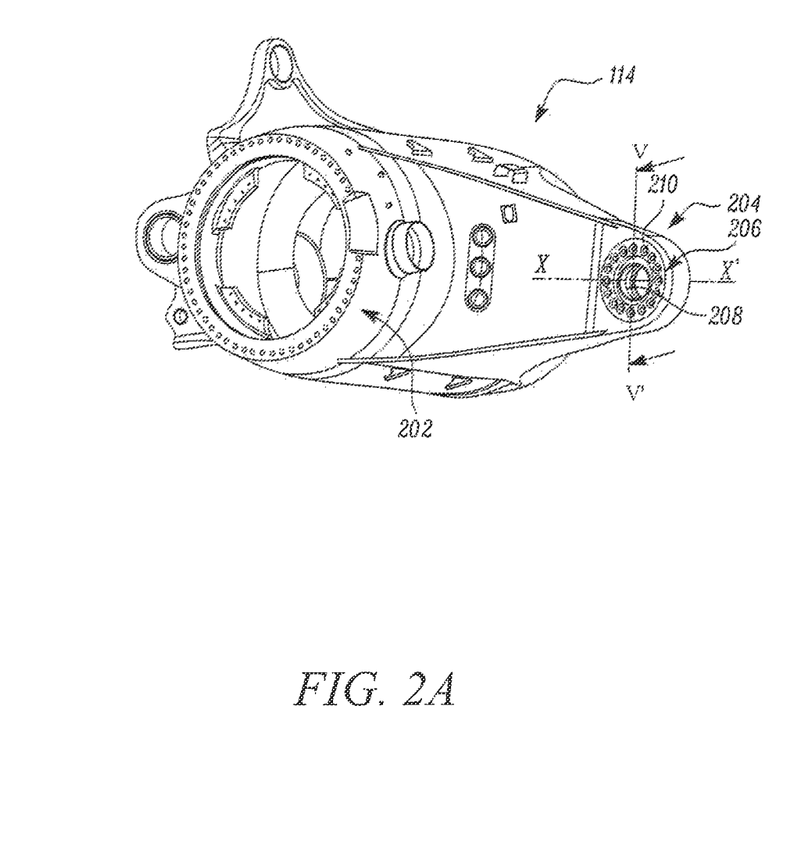
FIGS. 2A and 2B are different perspective views of an axle frame of the machine, according to one embodiment of the present disclosure.
Figure 2B:
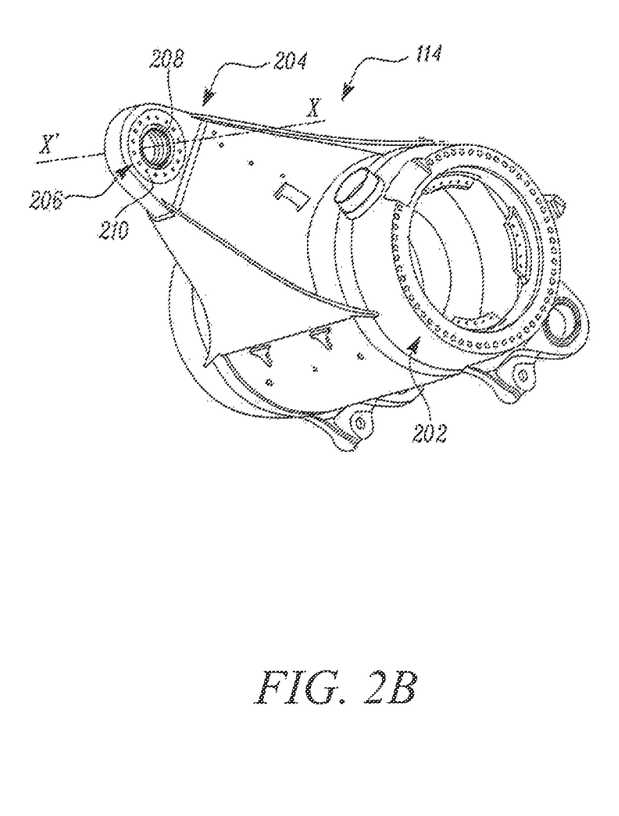

Referring to FIGS. 2A and 2B, different perspective views of the axle frame 114 are illustrated. The axle frame 114 includes a body portion 202. The body portion 202 is adapted to rotatably receive the set of wheels 112. The axle frame 114 also includes a nose cone portion 204. The nose cone portion 204 extends away from the body portion 202 and includes a bore 206. The bore 206 defines a central axis X-X'. The nose cone portion 204 is adapted to be pivotally coupled to the chassis 102 of the machine 100 through the bore 206. More specifically, a portion of the chassis 102 is provided through the bore 206 in order to pivotally couple the nose cone portion 204 to the chassis 102. Accordingly, the axle frame 114 is adapted to rotatably couple the set of wheels 112 to the chassis 102.

The axle frame 114 also includes a bearing member 208. The bearing member 208 will be hereinafter interchangeably referred to as the "bearing 208". The bearing 208 is removably disposed within the bore 206 and axially aligned along the central axis X-X' between the chassis 102 and the axle frame 114. The bearing 208 is adapted to provide a bearing surface between the bore 206 and the chassis 102 for pivotal movement of the chassis 102 relative to the nose cone portion 204. In the illustrated embodiment, the bearing 208 is a spherical type bearing element. In other embodiments, the bearing 208 may be any other type of bearing, such as a roller type bearing element, and so on.

Figure 3A:
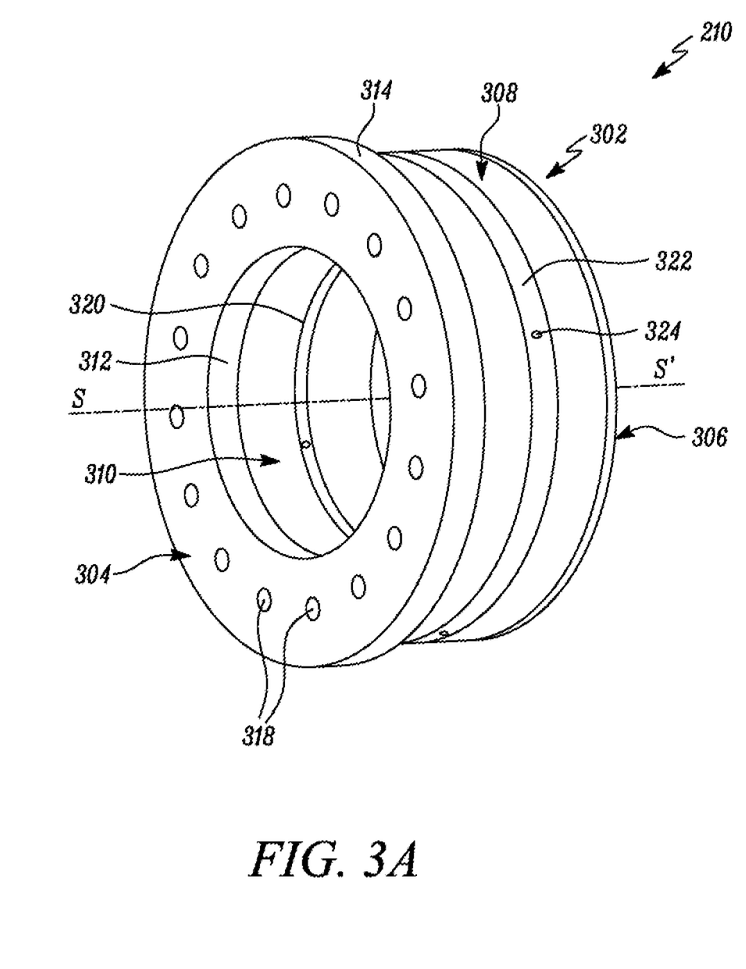
FIGS. 3A and 3B are different perspective views of a portion of a retention system for a bearing member, according to one embodiment of the present disclosure.
Figure 3B:
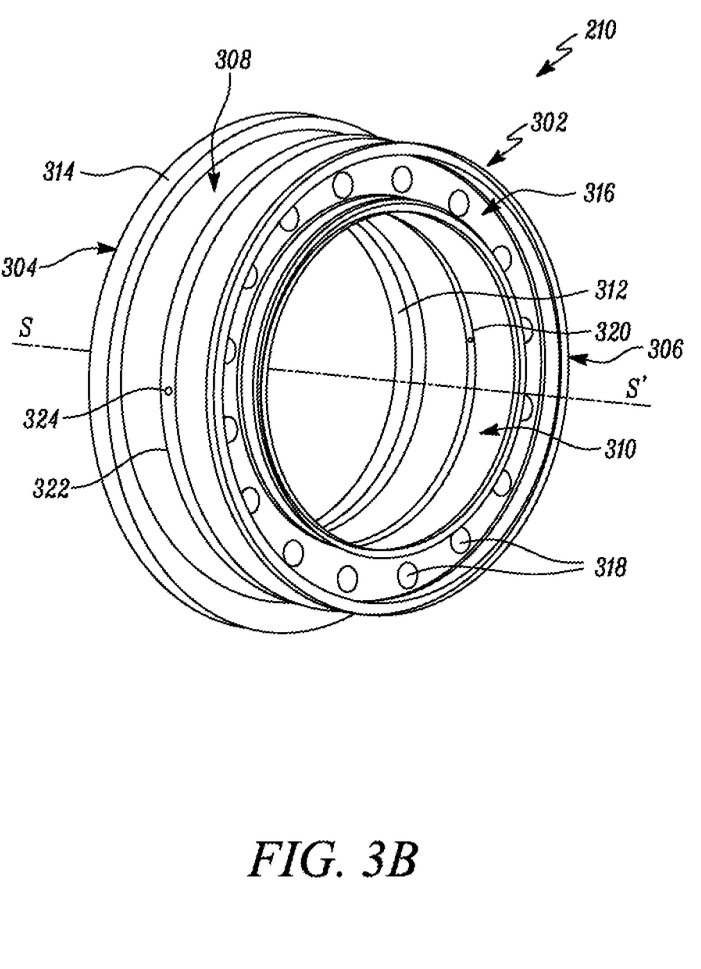

The axle frame 114 also includes a retention system 210. The retention system 210 will be hereinafter interchangeably referred to as the "system 210". The system 210 is disposed within the bore 206 in association with the bearing 208. The system 210 is adapted to limit movement of the bearing 208 along the central axis X-X' relative to the bore 206. The system 210 includes a sleeve member 302. Referring to FIGS. 3A and 3B, different perspective views of the sleeve member 302 are illustrated. The sleeve member 302 will be hereinafter interchangeably referred to as the "sleeve 302".

The sleeve 302 has a substantially annular configuration defining a sleeve axis S-S'. Accordingly, the sleeve 302 defines an outer side 304 and an inner side 306. The inner side 306 is disposed opposite to the outer side 304 along the sleeve axis S-S'. The sleeve 302 also defines an outer surface 308 and an inner surface 310. The inner surface 310 is disposed opposite to the outer surface 308 about the sleeve axis S-S'. Also, each of the outer surface 308 and the inner surface 310 extends between the outer side 304 and the inner side 306 of the sleeve 302. The sleeve 302 is adapted to be disposed between the bearing 208 and the bore 206 axially aligned along the central axis X-X'.

The sleeve 302 also includes a first inner shoulder 312. The first inner shoulder 312 is disposed on the inner surface 310 and adjacent to the outer side 304 of the sleeve 302. In other embodiments, the first inner shoulder 312 may be disposed spaced apart from the outer side 304 of the sleeve 302. The first inner shoulder 312 extends away from the inner surface 310 of the sleeve 302 substantially perpendicular to the sleeve axis S-S'. In other embodiments, the first inner shoulder 312 may be disposed at any angle relative to the sleeve axis S-S'. The first inner shoulder 312 is adapted to engage with the bearing 208 and limit movement of the bearing member 208 in a first axial direction "D1" (shown in FIG. 5) relative to the bore 206, and will be explained in more detail later.

The sleeve 302 also includes a first outer shoulder 314. The first outer shoulder 314 is disposed on the outer surface 308 and adjacent to the outer side 304 of the sleeve 302. In other embodiments, the first outer shoulder 314 may be disposed spaced apart from the outer side 304 of the sleeve 302. The first outer shoulder 314 extends away from the outer surface 308 of the sleeve 302 substantially perpendicular to the sleeve axis S-S'. In other embodiments, the first outer shoulder 314 may be disposed at any angle relative to the sleeve axis S-S'. Also, in the illustrated embodiment, the first outer shoulder 314 is aligned relative to the first inner shoulder 312. In other embodiments, the first outer shoulder 314 may be offset relative to the first inner shoulder 312. The first outer shoulder 314 is adapted to engage with the bore 206 and limit movement of the sleeve 302 in a second axial direction "D2" (shown in FIG. 5) relative to the bore 206, and will be explained in more detail later.

The sleeve 302 also includes a recess 316. The recess 316 has a substantially circular configuration. The recess 316 is disposed on the inner side 306 of the sleeve member 302 concentrically aligned relative to the sleeve axis S-S'. The sleeve 302 further includes a plurality of first holes 318. Each of the first holes 318 is disposed adjacent to one another. Also, each of the first holes 318 extends between the outer side 304 and the inner side 306 of the sleeve 302. More specifically, each of the first holes 318 extends between the outer side 304 and the recess 316 of the sleeve 302. Further, each of the first holes 318 is disposed substantially parallel relative to the sleeve axis S-S'. In the illustrated embodiment, each of the first holes 318 is partially threaded. In other embodiments, each of the first holes 318 may be completely threaded or may be non-threaded holes, based on application requirements.

The sleeve 302 also includes an inner circumferential groove 320 disposed on the inner surface 310. Additionally, the sleeve 302 includes an outer circumferential groove 322 disposed on the outer surface 308. Each of the inner circumferential groove 320 and the outer circumferential groove 322 is concentrically aligned relative to the sleeve axis S-S'. In the illustrated embodiment, each of the inner circumferential groove 320 and the outer circumferential groove 322 is aligned relative to one another. In other embodiments, each of the inner circumferential groove 320 and the outer circumferential groove 322 may be offset relative to one another.

Further, the sleeve 302 includes one or more passages 324 provided in fluid communication with each of the inner circumferential groove 320 and the outer circumferential groove 322. As such, each of the passages 324 extends between the outer surface 308 and the inner surface 310 of the sleeve 302. The sleeve 302 may be made of any material, such as high strength steel, any other high strength alloy or metal, and so on, based on application requirements. The sleeve 302 may be manufactured using any process, such as casting, forging, fabrication, additive manufacturing, and so on, based on application requirements.

Figure 4A:
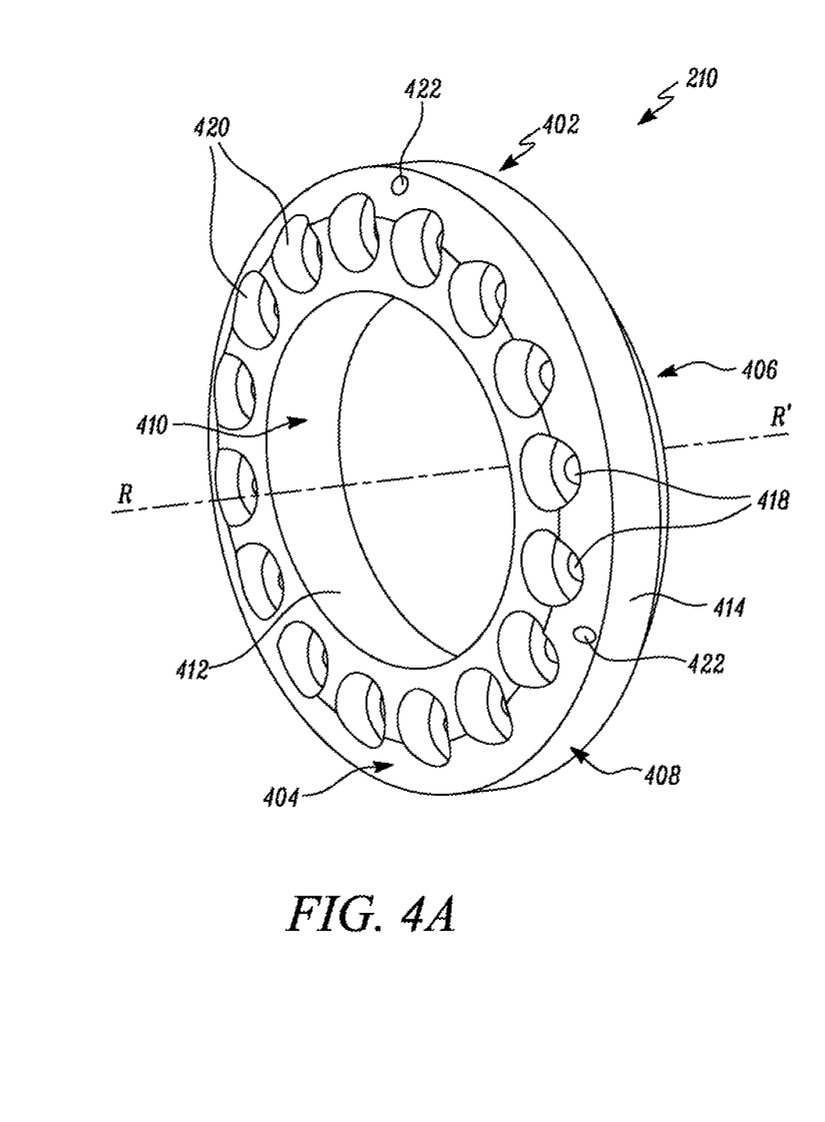
FIGS. 4A and 4B are different perspective views of another portion of the retention system, according to one embodiment of the present disclosure.
Figure 4B:
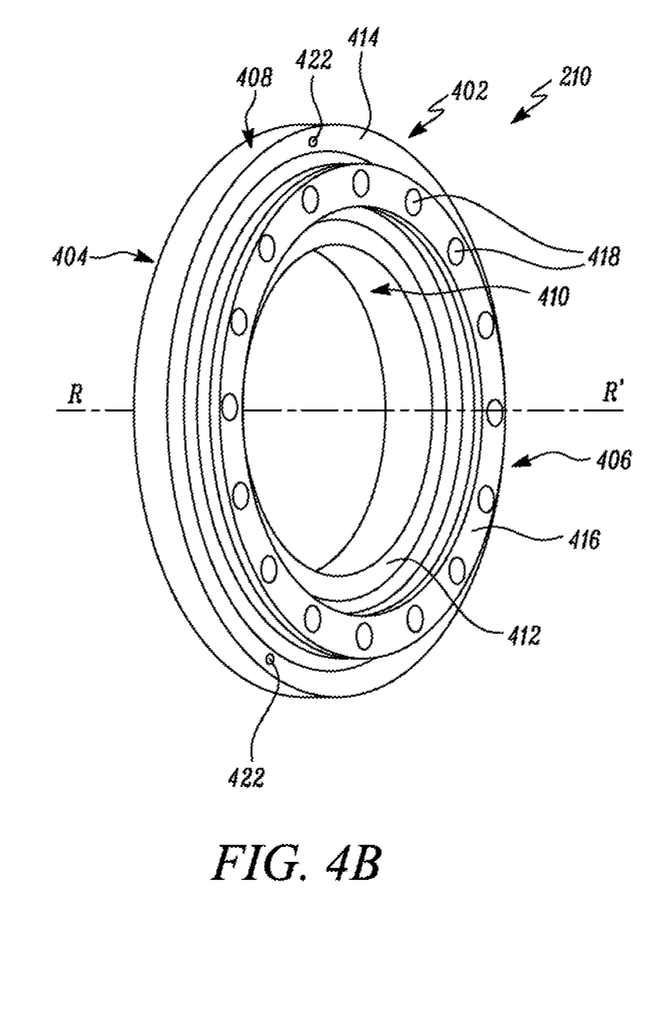

The system 210 also includes a retention member 402. Referring to FIGS. 4A and 4B, different perspective views of the retention member 402 are illustrated. The retention member 402 will be hereinafter interchangeably referred to as the "retainer 402". The retainer 402 has a substantially annular configuration defining a retainer axis R-R'. Accordingly, the retainer 402 defines an outer side 404 and an inner side 406. The inner side 406 is disposed opposite to the outer side 404 along the retainer axis R-R'. The retainer 402 also defines an outer surface 408 and an inner surface 410. The inner surface 410 is disposed opposite to the outer surface 408 about the retainer axis R-R'. Also, each of the outer surface 408 and the inner surface 410 extends between the outer side 404 and the inner side 406 of the retainer 402. The retainer 402 is adapted to be disposed between the bearing 208 and the bore 206 axially aligned along the central axis X-X'.

The retainer 402 also includes a second inner shoulder 412. The second inner shoulder 412 is disposed on the inner surface 410 and adjacent to the outer side 404 of the retainer 402. In other embodiments, the second inner shoulder 412 may be disposed spaced apart from the outer side 404 of the retainer 402. The second inner shoulder 412 extends away from the inner surface 410 of the retainer 402 substantially perpendicular to the retainer axis R-R'. In other embodiments, the second inner shoulder 412 may be disposed at any angle relative to the retainer axis R-R'. The second inner shoulder 412 is adapted to engage with the bearing 208 and limit movement of the bearing member 208 in the second axial direction "D2" relative to the bore 206, and will be explained in more detail later.

The retainer 402 also includes a second outer shoulder 414. The second outer shoulder 414 is disposed on the outer surface 408 and adjacent to the outer side 404 of the retainer 402. In other embodiments, the second outer shoulder 414 may be disposed spaced apart from the outer side 404 of the retainer 402. The second outer shoulder 414 extends away from the outer surface 408 of the retainer 402 substantially perpendicular to the retainer axis R-R'. In other embodiments, the second outer shoulder 414 may be disposed at any angle relative to the retainer axis R-R'. Also, in the illustrated embodiment, the second outer shoulder 414 is aligned relative to the second inner shoulder 412. In other embodiments, the second outer shoulder 414 may be offset relative to the second inner shoulder 412. The second outer shoulder 414 is adapted to engage with the bore 206 and limit movement of the retainer 402 in the first axial direction "D1" relative to the bore 206, and will be explained in more detail later.

The retainer 402 also includes a protrusion 416. The protrusion 416 has a substantially circular configuration. The protrusion 416 is disposed on the inner side 406 of the retainer 402 concentrically aligned relative to the retainer axis R-R'. The retainer 402 further includes a plurality of second holes 418. Each of the second holes 418 is disposed adjacent to one another. Also, each of the second holes 418 extends between the outer side 404 and the inner side 406 of the retainer 402. More specifically, each of the second holes 418 extends between the outer side 404 and the protrusion 416 of the retainer 402. Further, each of the second holes 418 is disposed substantially parallel relative to the retainer axis R-R'. In the illustrated embodiment, each of the second holes 418 is a non-threaded hole. In other embodiments, each of the second holes 418 may be partially or completely threaded, based on application requirements.

The retainer 402 also includes a plurality of counterbores 420. Each of the counterbores 420 is disposed on the outer side 404 of the retention member 402 and spaced apart from another. Also, each of the counterbores 420 is axially aligned relative to each of the second holes 418, respectively. Additionally, the retainer 402 includes one or more auxiliary holes 422. In the illustrated embodiment, each of the auxiliary holes 422 extends between the outer side 404 and the inner side 406 of the retainer 402. In other embodiments, each of the auxiliary holes 422 may be disposed on the outer side 404 and may extend at least partly up to the inner side 406 of the retainer 402.

In the illustrated embodiment, each of the auxiliary holes 422 is a threaded hole. In other embodiments, each of the auxiliary holes 422 may be a non-threaded hole, based on application requirements. The retainer 402 may be made of any material, such as high strength steel, any other high strength alloy or metal, and so on, based on application requirements. The retainer 402 may be manufactured using any process, such as casting, forging, fabrication, additive manufacturing, and so on, based on application requirements.

Figure 5:
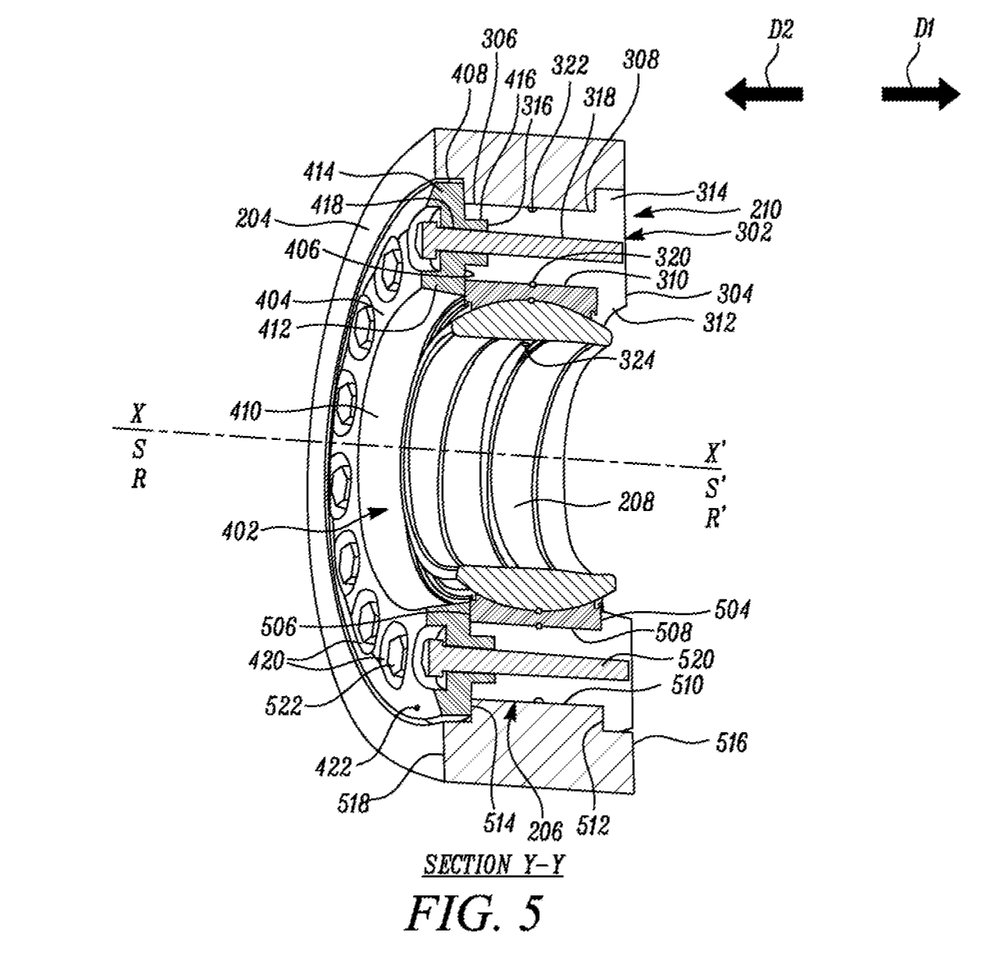
FIG. 5 is a perspective cross sectional view along section V-V' of the retention system in an assembled position, according to one embodiment of the present disclosure.

Referring to FIG. 5, a perspective cross sectional view of the system 210 along a section Y-Y (shown in FIG. 2A) is illustrated. In an assembled position of the system 210, the sleeve 302 is disposed between the bearing 208 and the bore 206. More specifically, the outer surface 308 of the sleeve 302 is disposed in contact with an inner surface 510 of the bore 206. Also, the inner surface 310 of the sleeve 302 is disposed in contact with an outer surface 508 of the bearing 208. As such, the sleeve 302 may be retained in the bore 206 using an interference fit between the bore 206 and the bearing 208.

Further, the first outer shoulder 314 of the sleeve 302 engages with a first groove 512 provided within the bore 206. Accordingly, the first outer shoulder 314 limits movement of the sleeve 302 in the second axial direction "D2" relative to the bore 206. In some embodiments, the first groove 512 within the bore 206 may be omitted. In such a situation, the first outer shoulder 314 may contact a side surface 516 of the bore 206. Also, the first inner shoulder 312 engages with a first side surface 504 of the bearing 208. Accordingly, the first inner shoulder 312 limits movement of the bearing 208 in the first axial direction "D1" relative to the bore 206.

Also, in an assembled position of the system 210, the retainer 402 is disposed between the bearing 208 and the bore 206. More specifically, the inner side 406 of the retainer 402 is disposed adjacent to the inner side 306 of the sleeve 302. Also, the recess 316 of the sleeve 302 removably receives the protrusion 416 of the retainer 402. As such, the retainer 402 is retained in the bore 206 using an interference fit between the protrusion 416 and the recess 316. Further, the second outer shoulder 414 of the retainer 402 engages with a second groove 514 provided within the bore 206. Accordingly, the second outer shoulder 414 limits movement of the retainer 402 in the first axial direction "D1" relative to the bore 206.

In some embodiments, the second groove 514 within the bore 206 may be omitted. In such a situation, the second outer shoulder 414 may contact a side surface 518 of the bore 206. Also, the second inner shoulder 412 engages with a second side surface 506 of the bearing 208. Accordingly, the second inner shoulder 412 limits movement of the bearing 208 in the second axial direction "D2" relative to the bore 206. Additionally, the sleeve 302 and the retainer 402 limit contact of the bearing 208 with the bore 206. As such, the sleeve 302 and the retainer 402 provide a sacrificial surface between the bore 206 and the bearing 208, in turn, limiting damage to the bore 206.

Additionally, the system 210 includes a plurality of fasteners 520. Each of the fasteners 520 is disposed through each of the sleeve 302 and the retainer 402, respectively. More specifically, each of the fasteners 520 is disposed through each of the first holes 318 and each of the second holes 418, respectively. Accordingly, each of the fasteners 520 is disposed spaced apart from another. Each of the fasteners 520 is adapted to limit movement of each of the sleeve 302 and the retainer 402 in the first axial direction "D1" and/or the second axial direction "D2" relative to the bore 206. In the illustrated embodiment, each of the fasteners 520 is a hexagonal bolt. As such, a head 522 of each of the fasteners 520 is received in each of the counterbores 420, respectively. In other embodiments, one or more of the fasteners 520 may be any fastening element, such as a multipoint bolt, a screw fastener, a nut and bolt set, and so on, based on application requirements.

INDUSTRIAL APPLICABILITY

Figure 6:
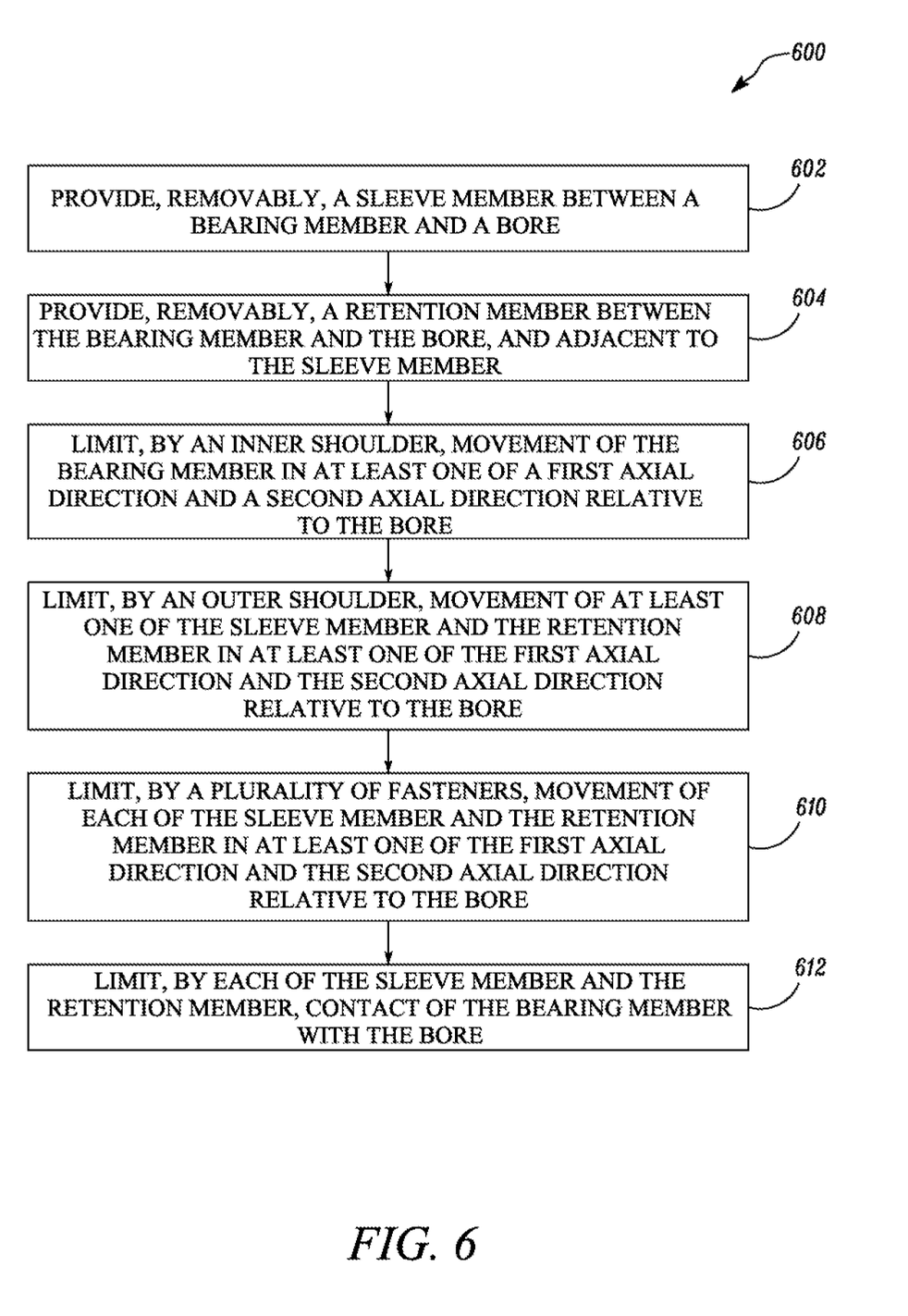
FIG. 6 is a flowchart of a method of protecting a bore provided within a component, according to one embodiment of the present disclosure.

The present disclosure relates to the retention system 210 for the bearing 208 and a method 600 for protecting the bore 206 provided within a component. In the illustrated embodiment, the component is the nose cone portion 204 of the axle frame 114. In other embodiments, the component may be any other component associated with the machine 100 or any other machine, such as a vehicle, a heavy machinery, a manufacturing equipment, and so on, based on application requirements. Referring to FIG. 6, a flowchart of the method 600 is illustrated. The method 600 will now be explained with combined reference to FIGS. 3A, 3B, 4A, 4B, 5, and 6.

At step 602, the sleeve 302 is removably provided between the bearing 208 and the bore 206. The sleeve 302 may be retained in the bore 206 using the interference fit between the inner surface 510 of the bore 206 and the outer surface 308 of the sleeve 302, and the inner surface 310 of the sleeve 302 and the outer surface 508 of the bearing 208. At step 604, the retainer 402 is removably provided between the bearing 208 and the bore 206, and adjacent to the sleeve 302. More specifically, the inner side 406 of the retainer 402 is provided adjacent to the inner side 306 of the sleeve 302, such that the protrusion 416 of the retainer 402 is received in the recess 316 of the sleeve 302. As such, the retainer 402 is retained in the bore 206 using the interference fit between the protrusion 416 and the recess 316.

At step 606, movement of the bearing 208 in at least one of the first axial direction "D1" and the second axial direction "D2" relative to the bore 206 is limited by an inner shoulder. More specifically, the first inner shoulder 312 disposed on the sleeve 302 contacts the first side surface 504 of the bearing 208. Accordingly, movement of the bearing 208 in the first axial direction "D1" relative to the bore 206 is limited by the first inner shoulder 312 disposed on the sleeve 302. Also, the second inner shoulder 412 disposed on the retainer 402 contacts the second side surface 506 of the bearing 208. Accordingly, movement of the bearing 208 in the second axial direction "D2" relative to the bore 206 is limited by the second inner shoulder 412 disposed on the retainer 402.

At step 608, movement of at least one of the sleeve 302 and the retainer 402 in at least one of the first axial direction "D1" and the second axial direction "D2" relative to the bore 206 is limited by an outer shoulder. More specifically, the first outer shoulder 314 disposed on the sleeve 302 engages with the first groove 512 within the bore 206. Accordingly, movement of the sleeve 302 in the second axial direction "D2" relative to the bore 206 is limited by the first outer shoulder 314. Also, the second outer shoulder 414 disposed on the retainer 402 engages with the second groove 514 within the bore 206. Accordingly, movement of the retainer 402 in the first axial direction "D1" relative to the bore 206 is limited by the second outer shoulder 414.

At step 610, movement of each of the sleeve 302 and the retainer 402 in at least one of the first axial direction "D1" and the second axial direction "D2" relative to the bore 206 is limited by the plurality of fasteners 520. More specifically, each of the fasteners 520 is provided through each of the first holes 318 in the sleeve 302, the second holes 418 in the retainer 402, and the counterbores 420 in the retainer 402, respectively, in order to retain each of the sleeve 302 and the retainer 402 between the bearing 208 and the bore 206, and limit movement of each of the sleeve 302 and the retainer 402 in the first axial direction "D1" and/or the second axial direction "D2" relative to the bore 206. As such, each of the sleeve 302 and the retainer 402 provides the sacrificial surface between the bearing 208 and the bore 206. Accordingly, at step 612, each of the sleeve 302 and the retainer 402 limits contact of the bearing 208 with the bore 206.

As such, the sleeve 302 and/or the retainer 402 provides a replaceable component between the bore 206 and the bearing 208. For example, during failure of the bearing 208, the sleeve 302 and/or the retainer 402 limits contact of the bearing 208 with the bore 206, in turn, limiting damage to the bore 206. Also, the sleeve 302 and the retainer 402 are disposed in the bore 206 with limited movement relative to the bore 206 and the bearing 208, in turn, limiting damage to the bore 206 due to friction and wear. Further, a combination of each of the sleeve 302, the retainer 402, and the fasteners 520 provides improved radial load and axial load bearing capacity within the bore 206.

Additionally, the sleeve 302 has a relatively higher thickness, in turn, providing improved resistance of each of the first holes 318 against bending moments. Also, the sleeve 302 is made of a higher strength material, in turn, providing improved stress bearing capacity between the inner surface 310 of the sleeve 302 and each of first holes 318. Further, due to the relatively higher thickness, each of the first holes 318 are disposed relatively closer to one another, in turn, providing improved resistance against bending moments. Further, the interference fit between the protrusion 416 of the retainer 402 and the recess 316 of the sleeve 302 limits bending and deformation of the system 210 along the central axis X-X', in turn, limiting failure of one or more of the fasteners 520, the bearing 208, the sleeve 302, the retainer 402, and/or the bore 206.

Each of the inner circumferential groove 320, the outer circumferential groove 322, and the passages 324 provides a path for a lubricant, such as grease, to flow from a lubricant passage (not shown) of the nose cone portion 204 to the bearing 208 via the sleeve 302. As such, each of the inner circumferential groove 320, the outer circumferential groove 322, and the passages 324 may allow flow of the lubricant from the nose cone portion 204 toward the bearing 208 in case of misalignment of the lubricant passage relative to the sleeve 302 and/or the bearing 208.

During assembly of the retainer 402 within the bore 206, each of the fasteners 520 may be torqued in a manner such that the retainer 402 may be forced toward the sleeve 302 in the first axial direction "D1". As such, the protrusion 416 of the retainer 402 may be forced into the recess 316 of sleeve 302 in order to form the interference fit between the protrusion 416 and the recess 316. Accordingly, the retainer 402 may not need to be frozen during the assembly, in turn, reducing process steps, limiting use of dedicated refrigeration/cryogenic equipment, reducing costs, and so on.

Each of the auxiliary holes 422 provided in the retainer 402 may be used during disassembling of the retainer 402 from the bore 206 relative to the sleeve 302. In one situation, a coupling element (not shown), such as a lifting eye, may be threadably disposed in one or more of the auxiliary holes 422. The retainer 402 may then be separated from the sleeve 302 by forcing the retainer 402 in the second axial direction "D2" away from the sleeve 302 using the coupling element. Further, the retainer 402 may be lifted and transported from one location to another using the coupling element.

In another situation, a fastening element, such as a bolt or a screw, may be threadably disposed in one or more of the auxiliary holes 422. The fastening element may then be continuously torqued, such that the fastening element may push against the second groove 514 of the bore 206 or the sleeve 302 in order to force the retainer 402 in the second axial direction "D2" away from the sleeve 302. As such, the auxiliary holes 422 provide pushing out of the retainer 402 with reduced effort, reduced time, and no damage to surrounding surfaces/elements.

In the illustrated embodiment, the first outer shoulder 314 of the sleeve 302 is disposed in the first groove 512 of the bore 206. As such, extension of the sleeve 302 away from the bore 206 in the first axial direction "D1" is reduced, in turn, limiting footprint and interference of the sleeve 302 with any adjacent component (not shown). Also, the second outer shoulder 414 of the retainer 402 is disposed in the second groove 514 of the bore 206. As such, extension of the retainer 402 away from the bore 206 in the second axial direction "D2" is reduced, in turn, limiting footprint and interference of the retainer 402 with any adjacent component (not shown). Further, the head 522 of each of the fasteners 520 is disposed in the counterbores 420 of the retainer 402, respectively. As such, extension of each of the fasteners 520 away from the bore 206 in the second axial direction "D2" is reduced, in turn, limiting footprint and interference of each of the fasteners 520 with any adjacent component (not shown).

The system 210 provides a simple, effective, and cost-efficient method to retain the bearing 208 within the bore 206 and further limit contact of the bearing 208 with the bore 206. As such, the system 210 may protect the bore 206 against damage due to failure of the bearing 208, friction and wear due to relative movement between surfaces, and soon. Further, during damage to the system 210, one or more components of the system 210 may be easily replaced, in turn, limiting need to repair the bore 206, reducing effort, reducing machine downtime, reducing costs, and so on. The system 210 may be retrofitted on any bearing/bore with little or no modification to existing system, in turn, providing flexibility and compatibility.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A retention system for a bearing member disposed within a bore, the retention system comprising:

a cylindrical bore adapted to circumscribe a bearing member;

a sleeve member disposed between the bearing member and the bore, the sleeve member having a substantially annular configuration defining an outer side, an inner side, an outer surface, and an inner surface;

a retention member disposed between the bearing member and the bore, the retention member having a substantially annular configuration defining an outer side, an inner side, an outer surface, and an inner surface, the inner side of the retention member disposed adjacent to the inner side of the sleeve member;

an inner shoulder disposed on the inner surface of at least one of the sleeve member and the retention member, the inner shoulder adapted to engage with the bearing member and limit movement of the bearing member in at least one of a first axial direction and a second axial direction relative to the bore;

an outer shoulder disposed on the outer surface of at least one of the sleeve member and the retention member, the outer shoulder adapted to engage with the bore and limit movement of at least one of the sleeve member and the retention member in at least one of the first axial direction and the second axial direction relative to the bore; and a plurality of fasteners disposed through each of the sleeve member and the retention member, each of the plurality of fasteners disposed spaced apart from another, each of the plurality of fasteners adapted to limit movement of each of the sleeve member and the retention member in at least one of the first axial direction and the second axial direction relative to the bore, wherein each of the sleeve member and the retention member is adapted to limit contact of the bearing member with the bore.

2. The retention system of claim 1, wherein the inner shoulder further includes a first inner shoulder disposed on the inner surface of the sleeve member, the first inner shoulder adapted to engage with a first side surface of the bearing member and limit movement of the hearing member in the first axial direction relative to the bore.

3. The retention system of claim 2, wherein the inner shoulder further includes a second inner shoulder disposed on the inner surface of the retention member, the second inner shoulder adapted to engage with a second side surface of the bearing member and limit movement of the bearing member in the second axial direction relative to the bore.

4. The retention system of claim 1, wherein the outer shoulder further includes a first outer shoulder disposed on the outer surface of the sleeve member, the first outer shoulder adapted to engage with a first groove provided within the bore and limit movement of the sleeve member in the second axial direction relative to the bore.

5. The retention system of claim 4, wherein the outer shoulder further includes a second outer shoulder disposed on the outer surface of the retention member, the second outer shoulder adapted to engage with a second groove provided within the bore and limit movement of the retention member in the first axial direction relative to the bore.

6. The retention system of claim 1 further includes:

a protrusion disposed on the inner side of the retention member; and a recess disposed on the inner side of the sleeve member, the recess adapted to removably receive the protrusion of the retention member.

7. The retention system of claim 1 further includes a plurality of counterbores disposed on the outer side of the retention member, each of the plurality of counterbores disposed spaced apart from another.

8. The retention system of claim 1 further includes a circumferential groove disposed on each of the inner surface and the outer surface of the sleeve member.

9. A machine comprising:

a chassis;

an axle frame having a bore and pivotally coupled to the chassis through the bore;

a bearing member disposed within the bore between the chassis and the axle frame; and a retention system disposed within the bore in association with the bearing member, the retention system including:

a sleeve member disposed between the bearing member and the bore, the sleeve member having a substantially annular configuration defining an outer side, an inner side, an outer surface, and an inner surface;

a retention member disposed between the bearing member and the bore, the retention member having a substantially annular configuration defining an outer side, an inner side, an outer surface, and an inner surface, the inner side of the retention member disposed adjacent to the inner side of the sleeve member;

an inner shoulder disposed on the inner surface of at least one of the sleeve member and the retention member, the inner shoulder adapted to engage with the bearing member and limit movement of the bearing member in at least one of a first axial direction and a second axial direction relative to the bore;

an outer shoulder disposed on the outer surface of at least one of the sleeve member and the retention member, the outer shoulder adapted to engage with the bore and limit movement of at least one of the sleeve member and the retention member in at least one of the first axial direction and the second axial direction relative to the bore; and a plurality of fasteners disposed through each of the sleeve member and the retention member, each of the plurality of fasteners disposed spaced apart from another, each of the plurality of fasteners adapted to limit movement of each of the sleeve member and the retention member in at least one of the first axial direction and the second axial direction relative to the bore, wherein each of the sleeve member and the retention member is adapted to limit contact of the bearing member with the bore.

10. The machine of claim 9, wherein the inner shoulder further includes a first inner shoulder disposed on the inner surface of the sleeve member, the first inner shoulder adapted to engage with a first side surface of the bearing member and limit movement of the bearing member in the first axial direction relative to the bore.

11. The machine of claim 10, wherein the inner shoulder further includes a second inner shoulder disposed on the inner surface of the retention member, the second inner shoulder adapted to engage with a second side surface of the bearing member and limit movement of the bearing member in the second axial direction relative to the bore.

12. The machine of claim 9, wherein the outer shoulder further includes a first outer shoulder disposed on the outer surface of the sleeve member, the first outer shoulder adapted to engage with a first groove provided within the bore and limit movement of the sleeve member in the second axial direction relative to the bore.

13. The machine of claim 12, wherein the outer shoulder further includes a second outer shoulder disposed on the outer surface of the retention member, the second outer shoulder adapted to engage with a second groove provided within the bore and limit movement of the retention member in the first axial direction relative to the bore.

14. The machine of claim 9 further includes:
a protrusion disposed on the inner side of the retention member; and
a recess disposed on the inner side of the sleeve member, the recess adapted to removably receive the protrusion of the retention member.

15. The machine of claim 9 further includes a plurality of counterbores disposed on the outer side of the retention member, each of the plurality of counterbores disposed spaced apart from another.

16. A method for protecting a bore provided within a component, the bore adapted to removably receive a bearing member, the method comprising:
providing, removably, a sleeve member between the bearing member and the bore;
providing, removably, a retention member between the bearing member and the bore, and adjacent to the sleeve member;
limiting, by an inner shoulder, movement of the bearing member in at least one of a first axial direction and a second axial direction relative to the bore;
limiting, by an outer shoulder, movement of at least one of the sleeve member and the retention member in at least one of the first axial direction and the second axial direction relative to the bore;
limiting, by a plurality of fasteners, movement of each of the sleeve member and the retention member in at least one of the first axial direction and the second axial direction relative to the bore.

17. The method of claim 16 further includes limiting movement of the bearing member in the first axial direction relative to the bore by a first inner shoulder disposed on the sleeve member.

18. The method of claim 17 further includes limiting movement of the bearing member in the second axial direction relative to the bore by a second inner shoulder disposed on the retention member.

19. The method of claim 16 further includes limiting movement of the sleeve member in the second axial direction relative to the bore by a first outer shoulder disposed on the sleeve member.

20. The method of claim 19 further includes limiting movement of the retention member in the first axial direction relative to the bore by a second outer shoulder disposed on the retention member.

* * * * *